United States Patent
Crosson et al.

(10) Patent No.: US 6,760,408 B2
(45) Date of Patent: Jul. 6, 2004

(54) SYSTEMS AND METHODS FOR PROVIDING A USER-FRIENDLY COMPUTING ENVIRONMENT FOR THE HEARING IMPAIRED

(75) Inventors: David Crosson, Kissimmee, FL (US); Mike Vermilyea, Orlando, FL (US)

(73) Assignee: Cingular Wireless, LLC, Atlanta, GA (US)

( * ) Notice: Subject to any disclaimer, the term of this patent is extended or adjusted under 35 U.S.C. 154(b) by 0 days.

(21) Appl. No.: 10/264,244

(22) Filed: Oct. 3, 2002

(65) Prior Publication Data

US 2004/0066914 A1 Apr. 8, 2004

(51) Int. Cl.$^7$ .............................................. H04M 11/00
(52) U.S. Cl. ...................................... 379/52; 379/93.17
(58) Field of Search ................................ 379/52, 93.15, 379/93.17, 93.25, 90.01; 704/271, 277, 235

(56) References Cited

U.S. PATENT DOCUMENTS

| 5,839,109 | A | * | 11/1998 | Iwamida | 704/271 |
| 5,982,853 | A | * | 11/1999 | Liebermann | 379/52 |
| 6,377,925 | B1 | * | 4/2002 | Greene, Jr. et al. | 379/52 |
| 6,564,186 | B1 | * | 5/2003 | Kiraly et al. | 704/260 |

* cited by examiner

*Primary Examiner*—Stella Woo
(74) *Attorney, Agent, or Firm*—Coulter C. Henry, Jr.

(57) ABSTRACT

A program enhancer system and method for embedding hearing-impaired friendly information into an existing computer program is provided. The existing computer program contains program information that is translated into a format usable by a hearing-impaired user. The systems and methods retrieves desired program information and translates the information into any of animation, digital movie and still image formats to be displayed to the user on a display device. A hyperlink is associated with the translated data and is stored in a memory device. The user can access the translated information using any type of input including hyperlink based inputs or natural language inputs.

14 Claims, 9 Drawing Sheets

SYSTEMS AND METHODS FOR PROVIDING A USER-FRIENDLY COMPUTING ENVIRONMENT FOR THE HEARING IMPAIRED

BACKGROUND OF THE INVENTION

1. Field of Invention

This invention generally relates to systems and methods for providing a video enhancement to computer programs to benefit the hearing impaired.

2. Description of Related Art

With the advent of computing and web surfing, the fundamental way of existence today requires basic knowledge and use of a computer. With the increase in use of computers and a computer's services, the complexities of computer programs have also increased. Thus, even the most experienced users must occasionally resort to using the Help Menu of a program to find answers to computing problems or information regarding a computer program in use.

For most users, the format of current help menus is sufficient for use and navigation. However, it is sometimes difficult to read a help menu task on a display device while attempting to simultaneously navigate through the instructed tasks. As an added feature to many Help Menu programs, "voiced" instructions are provided that allow a user to navigate through tasks without having to visually concentrate on the help menu display. However, in the United States alone more than 28 million people have hearing impairments. Thus, a system using such a method would have no advantage for a hearing impaired user. Admittedly, there has been little technological advancement related to the improvement of computer programs and help menus to assist the hearing impaired.

Most approaches for advancement for the hearing-impaired have been simply to provide a translator-type device that converts input information into a media that can be understood by a hearing impaired user. However, much of the world has not taken the hearing impaired into consideration when initially creating user services, such as computer programs and help menus.

SUMMARY OF THE INVENTION

As outlined above, conventional computer programs and help menus are not robust and adaptable to the hearing impaired and are limited in their user friendliness to a hearing impaired user. Thus, it is an object of the present invention to provide a user-friendly computing environment for the hearing-impaired by supplying a program or help menu "patch" that provides signed instructions or responses to queries in a help menu or program.

This invention provides systems and methods for converting existing text information into hearing-impaired friendly information.

This invention provides systems and methods that modify existing programs and embed hearing-impaired friendly information into existing programs and help menus.

This invention additionally provides systems and methods for providing computer programs with hearing-impaired friendly information.

This invention further provides systems and methods for searching for and providing hearing-impaired friendly information to a hearing-impaired user via a database device in response to a user query.

This invention separately provides systems and methods for extracting embedded information from a computer program for display to a user.

In various exemplary embodiments according to this invention, hearing-impaired friendly information is embedded into an existing computer program. The existing computer program can be any existing computer program that is capable of being displayed on a display device. The hearing-impaired friendly information can be any animation, sign language, phrase and finger spelled words that is adaptable to what is being displayed.

In various exemplary embodiments, the embedded hearing-impaired friendly information is extracted from a database of stored information. The stored information can be any type of digital or analog recorded movies in which videos of a person signing words, phrases or finger spelled words and of animations corresponding to the words.

In various exemplary embodiments, before the stored information is embedded, the text contained in a computer program is converted to a hearing-impaired friendly format and stored in a database. A user can then extract the stored information for viewing.

In various exemplary embodiments, a user can query a computer program containing the embedded information. In response to the query, the systems and methods described herein can retrieve and display the appropriate information for display to the user.

In various exemplary embodiments of the systems and methods according to this invention, for the most part, the stored information will be stored in a digital or analog movie format so that the information can be easily embedded into the subject computer program.

These and other features and advantages of this invention are described in or apparent from the following detailed description of the apparatus/systems and methods according to this invention.

BRIEF DESCRIPTION OF THE DRAWINGS

Various exemplary embodiments of this invention will be described in detail, with reference to the following figures, wherein.

DETAILED DESCRIPTION OF EXEMPLARY EMBODIMENTS

Figure 1:
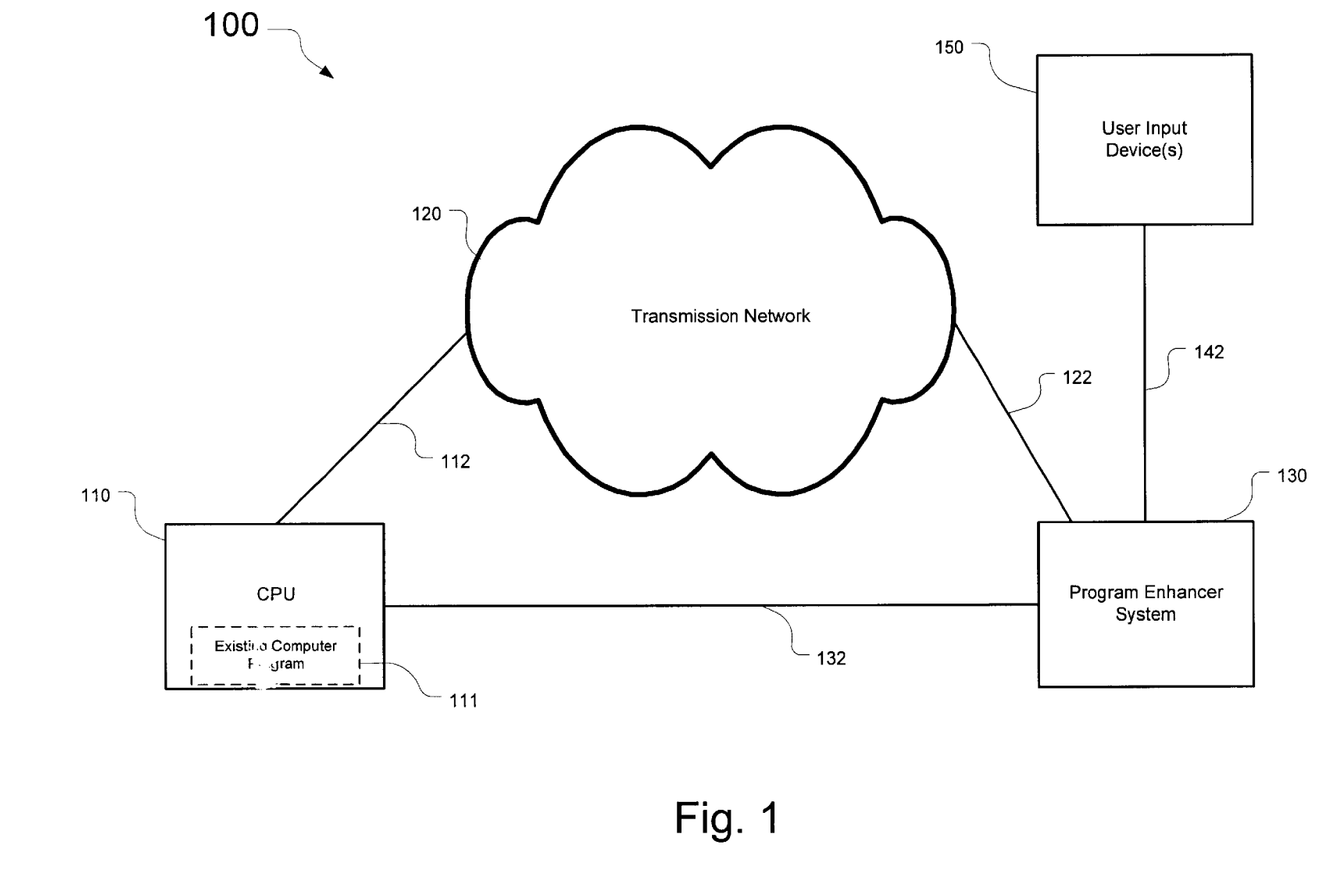
FIG. 1 is a block diagram depicting one exemplary embodiment of a hearing-impaired friendly system according to this invention.

FIG. 1 shows one exemplary embodiment of a hearing-impaired friendly system 100 that includes a program enhancer system 130. As shown in FIG. 1, one or more user input devices 150 are connected to the program enhancer system 130 via one or more links 142. The one or more user input devices 150 can be any known or later-developed device usable to input data and/or commands, such as a keyboard, a mouse, a voice recognition system, a digital ink pen, a trackball, a track pad or the like. The program enhancer system 130 is connected to a CPU 110 of the hearing-impaired friendly system 100 either directly over a link 132 or over links 122 and 112 and a transmission network 120 of the hearing-impaired friendly system 100.

The links 112, 122, 132 and 142 and the transmission network 120 can be any now known or later-developed device or system usable to connect the one or more user input devices 150 and the CPU 110 to the program enhancer system 130, including, but not limited to, a direct cable connection, a connection over a wide area network or a local network, a connection over an intranet or a connection over an extranet, a connection over the Internet, or a connection over any other distributed processing network or system. In general, the links 112, 122, 132 and 142 and the transmission network 120 can be any appropriate known or later-developed connection system and/or structure.

The CPU 110 contains an existing computer program 111. Program data, such as text, can be retrieved by the program enhancer system 130 from the existing computer program 111 through CPU 110 and collaboratively shared by the components of the program enhancer system 130. It should be appreciated that CPU 110 can be a digital camera, a scanner, locally or remotely located computer, or any other known or later-developed system usable to generate electronic data or document information. Similarly, the CPU 110 can be any suitable device that stores and/or transmits electronic image or audio data, such as a client or a server of a network. The CPU 110 can be integrated with the program enhancer system 130 or may be remotely connected to the program enhancer system 130, such as over the transmission network 120.

It should also be appreciated that the existing computer program 111 is preferably implemented on a general-purpose computer, for example CPU 110. However, the existing computer program 111 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, a device capable of supplying appropriate data that can be used in the flowcharts shown in FIGS. 7 and 8, can be used.

Figure 2:
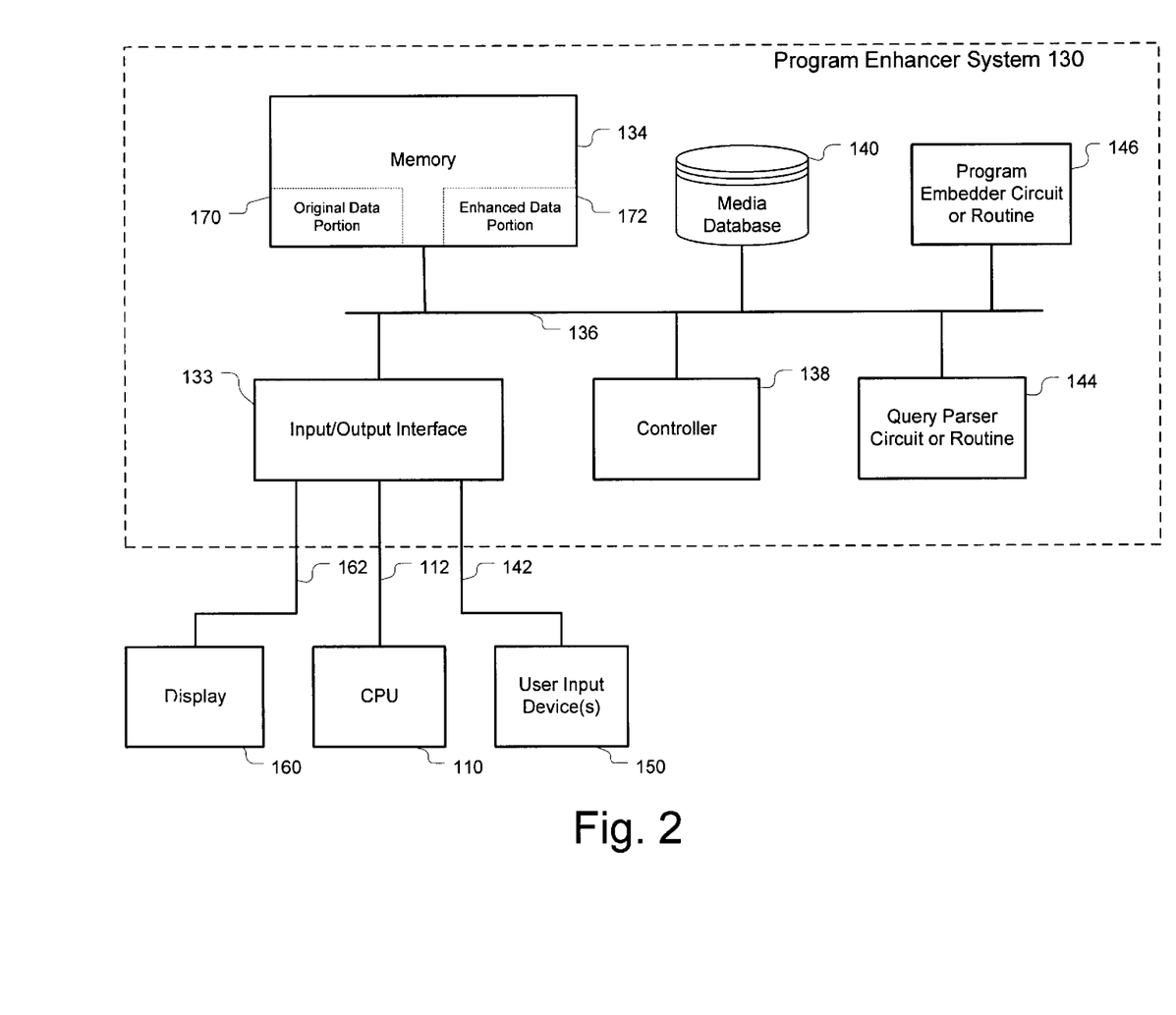
FIG. 2 is a block diagram depicting one exemplary embodiment of a program enhancer system according to this invention.

FIG. 2 shows one exemplary embodiment of a program enhancer system 130 according to this invention. As shown in FIG. 2, the program enhancer system 130 includes an input/output interface 133, a controller 138, a memory 134, a media database 140, a program embedder circuit or routine 146 and a query parser circuit or routine 144, each interconnected by one or more data/control busses or application programming interfaces 136. As further shown in FIG. 2, one or more user input devices 150 are connected over one or more links 142 to the input/output interface 133. Additionally, a CPU 110 is connected over a link 112 to the input/output interface 133, as is a display 160 over a link 162.

It should be understood that each of the circuits or routines shown in FIG. 2 could be implemented as portions of a suitably programmed general-purpose computer. Alternatively, each of the circuits or routines in FIG. 2 could be implemented as physically distinct hardware circuits within an ASIC, or using a FPGA, a PDL, a PLA or a PAL, a digital signal processor, or using discrete logic elements or discrete circuit elements. The particular form of each of the circuits or routines shown in FIG. 2 will take is a design choice and will be obvious and predicable to those skilled in the art.

Each of the links 162, 112 and 142 can be implemented using any known or later developed device or system for connecting the one or more user input devices 150, CPU 110 and display 160, respectively to the program enhancer system 130, including a direct cable connection, a connection over a wide area network, a local network or a storage area network, a connection over an intranet, a connection over the Internet, or a connection over any other distributed processing network or system. In general, each of the links 162, 112 and 142 can be any known or later developed connection system or structure usable to connect the one or more user input devices 150, CPU 110 and display 160, to the program enhancer system 130.

The input/output interface 133 inputs original data from the CPU 110 and/or the one or more user input devices 150 and outputs data to the display 160. The input/output interface 133 also outputs the original data to one or more of the controller 138, the memory 134, the media database 134, the program embedder circuit or routine 146 and the query parser circuit or routine 144.

The memory 134 includes one or more of an original data portion 170 and an enhanced data portion 172. The original data portion 170 stores the original data into which the enhanced data portion 172 will be embedded to form hearing-impaired friendly information, as later discussed herein. The enhanced data portion 172 stores links, pointers, hypertext information, etc. created by the program embedder circuit or routine 146 that indicates the location of the data to be embedded into the original data. The memory 134 can also store on or more control routines used by the controller 138 to operate the program enhancer system 130.

The memory 134 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writable or re-writable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The controller 138 can be implemented as a single special purpose integrated circuit (e.g., ASIC) each having a main or central processor section for overall, system-level control, and separate sections dedicated to performing various different specific computations, functions and other processes under the control of the central processor section. The controller 138 can also be implemented as a single microprocessor circuit or a plurality of separate dedicated or programmable integrated or other electronic circuits or devices, e.g., hardwired electronic or logic circuits such as discrete element circuits or programmable logic devices. The controller 138 also preferably includes other circuitry or components, such as memory devices, relays, mechanical linkages, communications devices, etc., to affect desired control and/or input/output functions.

The media database 140 stores a collection of digital or analog recorded movies and/or animations in which videos of a person signing words, phrases or finger spelled words and animations corresponding to text that is displayed in the existing computer program 111, as shown in FIG. 1. The digital movies and animations are indexed so that they can be associated with the appropriate text contained in the existing computer program 111. Although text is used in this exemplary embodiment as the format for the incoming data, it should be appreciated that the incoming data can be in the format of speech. In such an example, the processing devices (e.g., controller 138, query parser circuit or routine 144, input/output interface 133 and program enhancer circuit or routine 146) would be capable of recognizing speech in accordance with speech recognition methodologies as known to those skilled in the art.

The media database 140 can be implemented using any hardware or software means capable of producing a collection of data structured and organized in a disciplined fashion so that access to the information of interest is possible. The database structure can be stored in any now known or later developed way of structure, such as comma delineated.

The media database 140 can contain a preprogrammed set of thousands of digital movies and animations that correspond to commonly used phrases or words that appear in computer programs, for example, printing topics, header items, etc. The preprogrammed set can also correspond to hard-to-translate phrases or gestures that are a part of the hearing-impaired community's language (for example, ASL) that aren't easily translatable to spoken languages. It is preferable that each of the video clips or animations are produced so that they can easily be concatenated with other clips to produce a smooth, continuous video flow. This feature allows this invention to be fully usable by the hearing-impaired community.

In operation, and upon initiation of the existing computer program 111 contained on CPU 110, the program embedder circuit or routine 146, through the input/output interface 133 and over the link 112, retrieves the original data from the existing computer program 111 that represents the text of the help topics or any other desired information contained in the computer program. This process begins the initialization process of the program enhancer system 130. The initialization process performs the association and storage of the original data into a translated or animated format.

The program embedder circuit or routine 146 then translates the incoming original data into a desired format to create animated text, as requested by the user. The desired formats include translations to animations, digital movie images and/or still images. The translation process can be implemented using any electronic translation system capable of translating text to animated data, such as the system described in U.S. Pat. No. 6,377,925 to Interactive Solutions, Inc. The user, prior to initialization of the computer program, can select the desired format to which the text of the original data is translated. For, example, the incoming information can be translated into animations or finger spelled words. However, it should be appreciated that a set of the original data and its animated portions could have been previously input into the media database 140 at some earlier time. Upon translation of the information, the original data is then stored in the original data portion 170 of the memory 134. For ease of discussion, the term "animated text" is used herein to encompass both text-to-animation, text-to-digital movie and text-to-image translations.

Upon completion of the translation process, the program embedder circuit or routine 146, under the control of the controller 138, associates a hyperlink, pointer, etc. to the animated text or other selected format. The associated hyperlink, pointer, etc. is stored in the enhanced data portion 172 of the memory 134. The animated text and associated hyperlink, pointer, etc. are also displayed to the user on display 160 using conventional methods. The animated text is then stored in the media database 140. Once animated text for each word is stored, the translation and storing process does not have to be repeated for that word or phrase. Thus, once all of the incoming original data is translated to animated text or some other format, the initialization process is complete. It should be appreciated that the user may initially pre-select the amount of data to be translated, such as only program header information, main topics, commonly used items, etc.

The program embedder circuit or routine 146 is in communication with the controller 138 and has access to the media database 140. The media database 140 stores multimedia content in the form of, for example, digital movie files or animations. The multimedia data files may include audio data, video data, textual data, and the like.

Once the initialization process of the program enhancer system 130 is completed, the system of this invention enters a normal operation mode. During normal operation, when the program embedder circuit or routine 146 receives a natural language search request from the query parser circuit or routine 144, the program embedder circuit or routine 146 searches the digital movie data or animation of the multimedia content stored in the media database 140 in order to identify which of the multimedia content files and their corresponding segments contain a portion that is associated with the input natural language query. Based on the results of the natural language search, information regarding the multimedia content files identified as having associated content and the content of the multimedia data in which the associated is present may be provided to the program embedder circuit or routine 146 due to the natural language query.

During the normal mode of operation, the search request may be entered by a user of the user device 150 via a user interface (not shown) associated with the user device 150. The user interface may be, for example, a telephone keypad, a keyboard, a pointing device, a speech recognition system, and the like. The search request includes information regarding the target content for which the search is to be conducted and may also include other search criteria such as keywords, topics, image search criteria, and the like.

The normal mode of operation consists of two methods of accessing data. The first method of accessing data allows a user to simply input an initialization command such as a double click, or carriage return on the associated stored hyperlink to access the appropriate movie clip or animation. In this mode, using the user input device 150, the user can input the command. The input/output interface 133 recognizes the form of the input and sends a command to the program embedder circuit or routine 146 to access the appropriate hyperlink in the enhanced data portion 172 of memory 134 to determine the location of the associated media clip based on the stored hyperlink. The program embedder circuit or routine 146 then retrieves the appropriate media clip(s) for viewing on display 160.

In a second method of accessing data, a user can submit a natural language query at CPU 110 using the user input device 150. The natural language query is sent to the input/output interface 133 that determines if the incoming data is in the form of a natural language query. If the incoming information is in the form of a natural language query, under control of the controller 138, the incoming natural language is first sent to the query parser circuit or routine 144. The query parser circuit or routine 144 parses each word or phrase of the query into separate words and first determines if each word or phrase has an associated hyperlink stored in the enhanced data portion 172. If there exists an associated hyperlink in the enhanced data portion 172, the query parser circuit or routine 144 sends a command to the program embedder circuit or routine 146 to display the appropriate media clip, as discussed above. If there is not a previously stored hyperlink, the query parser circuit or routine 144 sends a command to the program embedder circuit or routine 146 to create the associated hyperlink and display the appropriate animation, etc.

The query parser circuit or routine 144 can be implemented using any natural language retrieval system, such as the system described in U.S. Pat. No. 6,393,428 to Microsoft®. However, it should be appreciated that the query system is not limited to natural language formats. Any keyword type searching can be implemented without departing from the scope of this invention.

Figure 3:
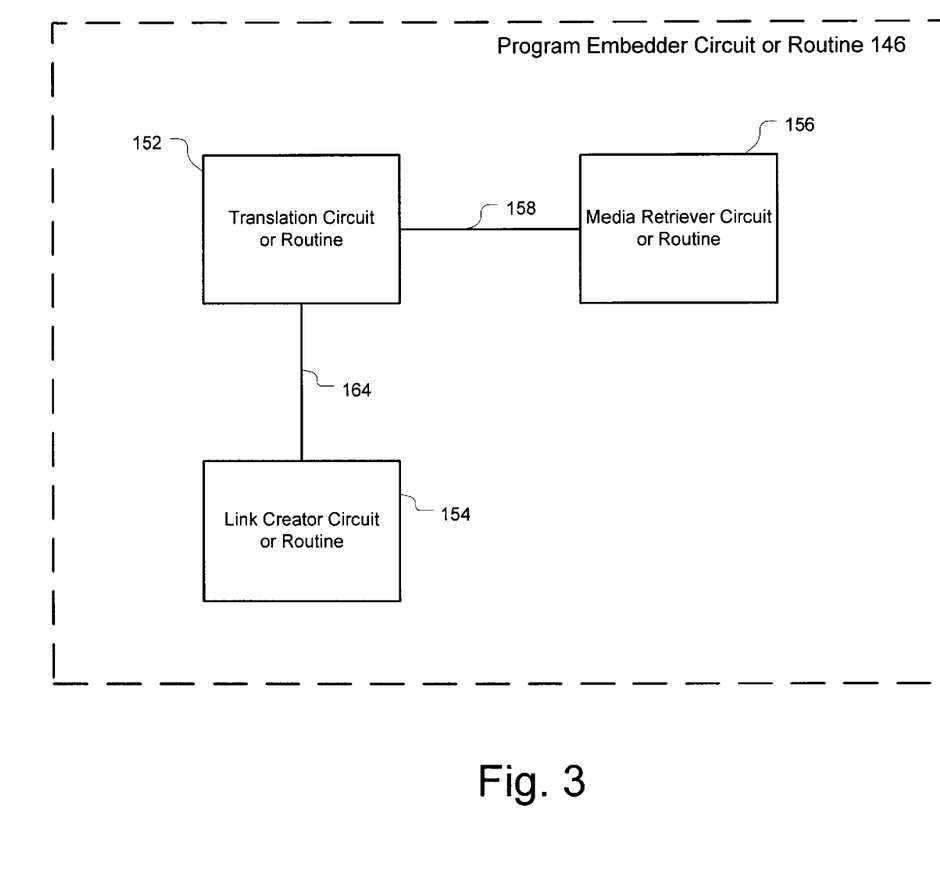
FIG. 3 is a block diagram depicting one exemplary embodiment of a program embedder system according to this invention.

FIG. 3 shows one exemplary embodiment of the program embedder circuit or routine 146 according to this invention. As shown in FIG. 3, the program embedder circuit or routine 146 includes a translation circuit or routine 152, a media retriever circuit or routine 156 and a link creator circuit or routine 154. The translation circuit or routine is connected to the media retriever circuit or routine 156 and the link creator circuit or routine 154 by links 158 and 164, respectively.

Each of the links 158 and 164 can be implemented using any known or later developed device or system for connecting the translation circuit or routine 152, media retriever circuit or routine 156 and link creator circuit or routine 154, including a direct cable connection, a connection over a wide area network, a local network or a storage area network, a connection over an intranet, a connection over the Internet, or a connection over any other distributed processing network or system. In general, each of the links 158 and 164 can be any now known or later developed connection system or structure usable to connect the translation circuit or routine 152, media retriever circuit or routine 156 and link creator circuit or routine 154.

Upon initialization of the existing program 111 on CPU 110, the translation circuit or routine 152 performs the translation of text contained in an existing computer program to a desired format for the program embedder circuit or routine 146. The translation circuit or routine 152 can be implemented using any now known or later developed program or device capable of recognizing natural language text for translation into a digital movie or animation format, such as the system described in U.S. Pat. No. 6,377,925.

In normal operation, the translation circuit or routine 152 receives the incoming text data from the existing program contained on CPU 110 through the query parser circuit or routine 144 to initialize the program enhancer system 130. The translation circuit or routine 152 then translates each of the retrieved words or phrases into a recognizable format usable to search or create the animations or digital video clips. The translation circuit or routine 152 first searches the enhanced data portion 172 of memory 134 to determine if an animation or digital move clip already exists for each received word or phrase. If there already exists an animation of digital movie clip, the translation circuit or routine 152 sends a command to the media retriever circuit or routine 156 to search the media database 140 for the appropriate animation or digital movie. Once the appropriate animation or digital movie has been located, the link creator circuit or routine 154 creates a hyperlink, pointer, or etc. to the location of the animation or digital movie clip stored in the media database 140. The newly created hyperlink, pointer, or etc. is then sent to the enhanced data portion 172 of memory 134 for storage and later use. If a word is not found in the enhanced data portion 172, the translation circuit or routine 152 then breaks down, each word in the incoming text and creates and animation for each word based on previously stored animations or clips in the media database 140 that show a person finger spelling each letter or phrase in accordance with techniques commonly used in ASL. It should be appreciated that it is preferable to morph each clip of the finger spelled letters or phrases so that a smooth transition and optimal viewing pleasure between each animated clip is achieved.

Once the program enhancer system 130 has been initialized, the translation circuit or routine 152 monitors the incoming data submitted by a user to determine if appropriate hyperlinks have been created. If there already exists an appropriate hyperlink, then operation simply continues as described above with respect to FIG. 2. If an appropriate animation does not exist, the translation process begins and a new link is created.

In the following discussions, a representation of Microsoft® Word has been used for illustration. However, it should be appreciated that any program or user interface could be used without departing from the scope of this invention.

Figure 4:
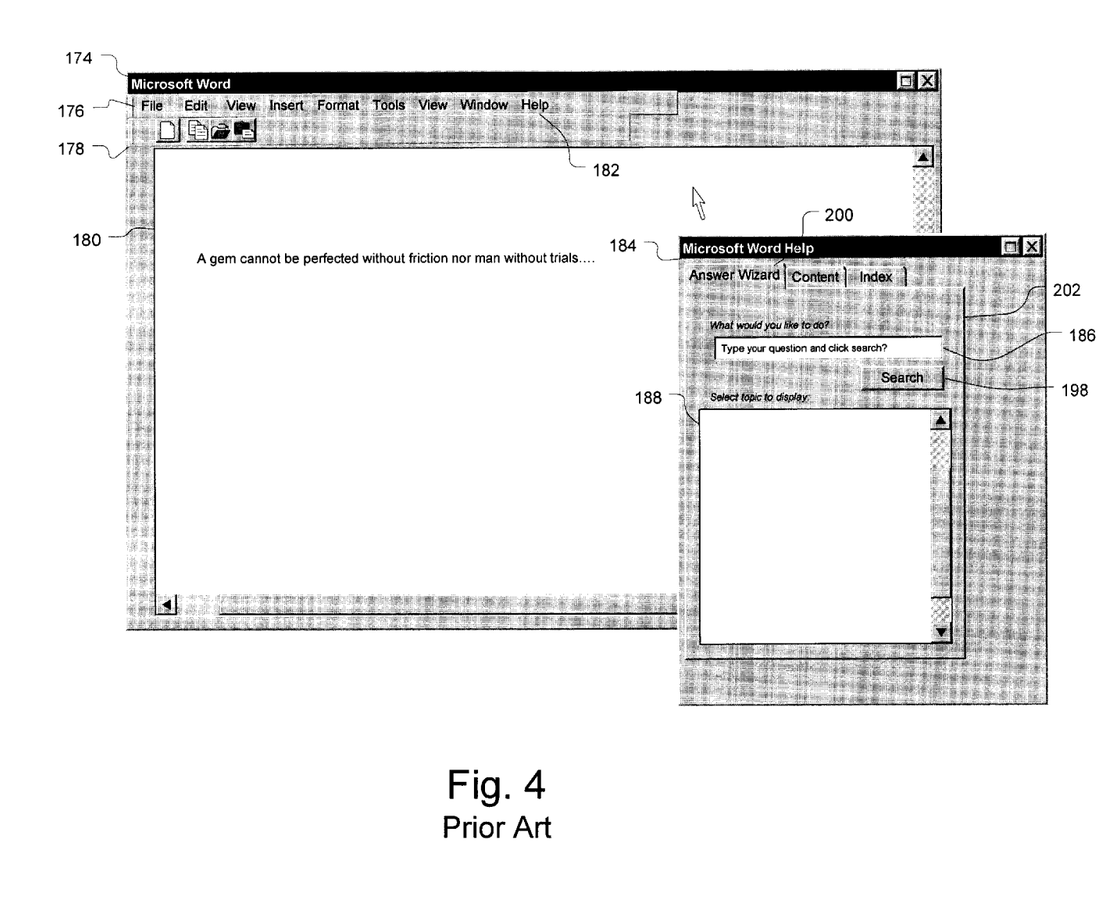
FIG. 4 is an exemplary representation of a conventional graphical user interface provided to a user for viewing.

FIG. 4 shows an exemplary conventional display Graphical User Interface (GUI) and illustrates a number of windows that are typically provided on a display to a user in a help program. More particularly, the GUI includes a program window 174 having toolbars 176 and 178, a text document 180 and a help dialog interface 184. Contained in the help dialog interface 184 is a help dialog box 202 having tab portions 200. Each tab portion contains a different interface format that allows a user to access the functions of the help menu. For illustrative purposes, the "Answer Wizard" interface of Microsoft® Word has been used. This "Answer Wizard" interface uses a natural language search format to retrieve the desired information. Using this interface, a user is able to input a natural language question into the edit box 186. Upon inputting the natural language question into the edit box, the user can double click the search button 198 to initialize the search process. As a result of double clicking the search button 198, the help program performs a search of the terms of the natural language question input into the edit box 186 against a database of stored topics and information. The program then returns matching or associated topics and information from the database. The returned topics and information are then displayed to the user in the text box 188 for access and further viewing.

Figure 5:
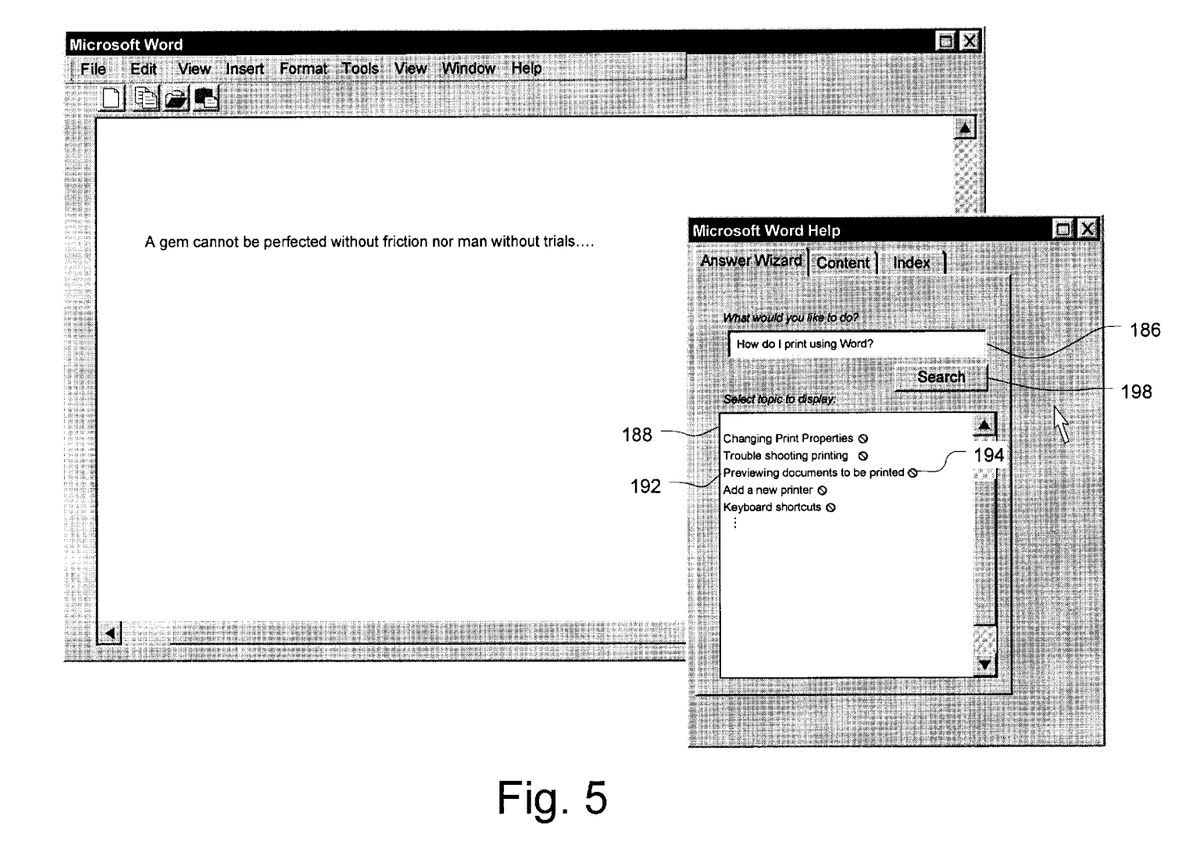
FIGS. 5 and 6 are an exemplary representations of a graphical user interface provided to a user for viewing according to this invention.

FIG. 5 shows an exemplary embodiment depicting a GUI in accordance with this invention. In this example, a user has input the natural language question, "How do I print using Word?" into the edit box 186. Subsequently, the information 192 has been returned to the user as a result of double clicking the search button 198. As one can see from FIG. 5, the information 192 has been returned to the text box 188 depicting various topics associated with the natural language question input into the edit box 186. Also shown are various icons 194 which indicate to the user that the topic is enabled with an animation box that displays a hearing-impaired friendly animation in accordance with this invention.

Figure 6:
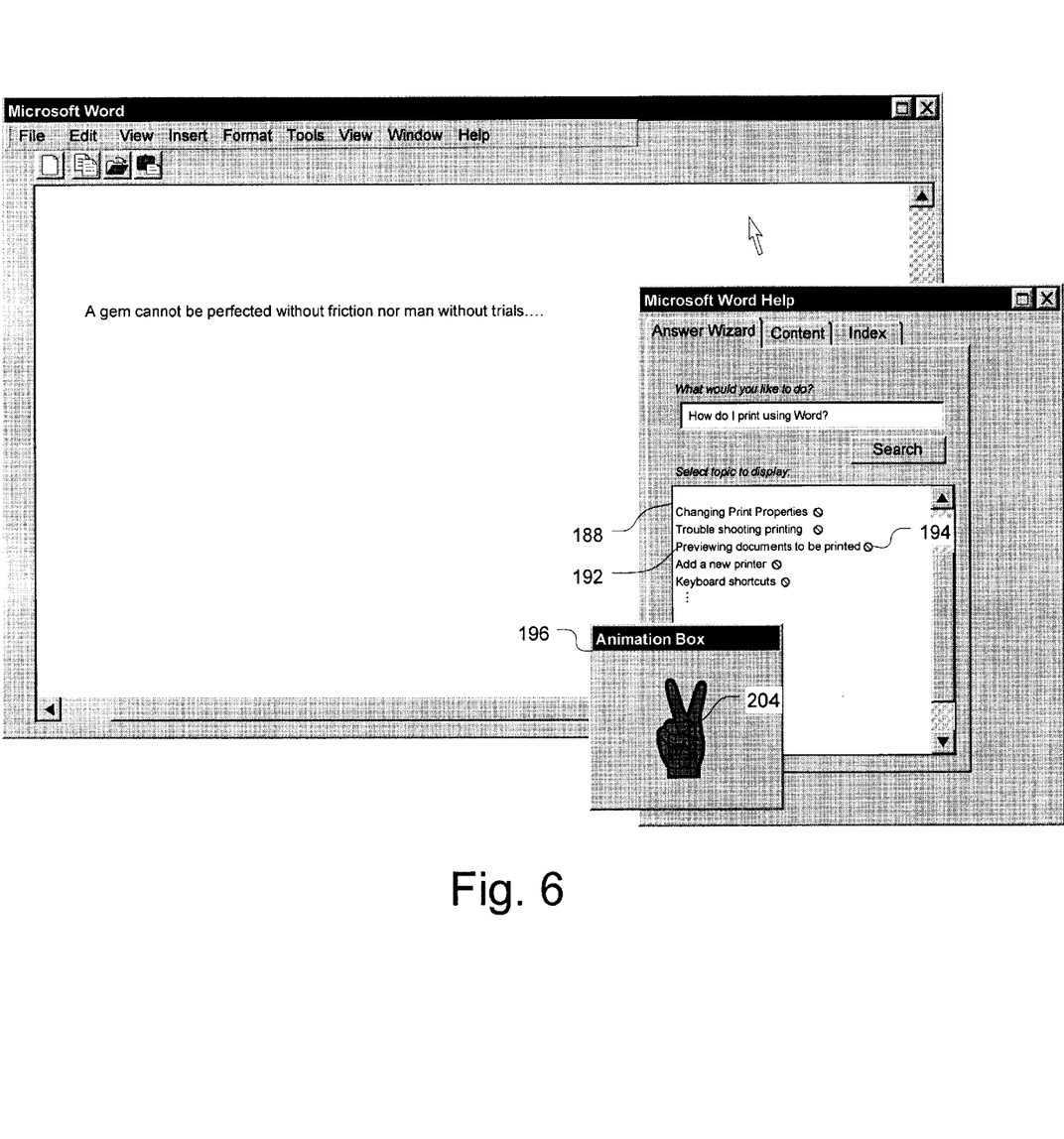

FIG. 6 shows an embodiment depicting the animation box 196. As one can see from FIG. 6, the animation box 196 displays an animation 204 of a finger spelled letter in accordance with this invention. A user has displayed the animation 204 as a result of double clicking the icon 194.

It should be apparent that the configuration of the GUI depicted in FIGS. 5 and 6 could be rearranged and modified in accordance with techniques that are known in the art without departing from the scope of this invention.

Figure 7:
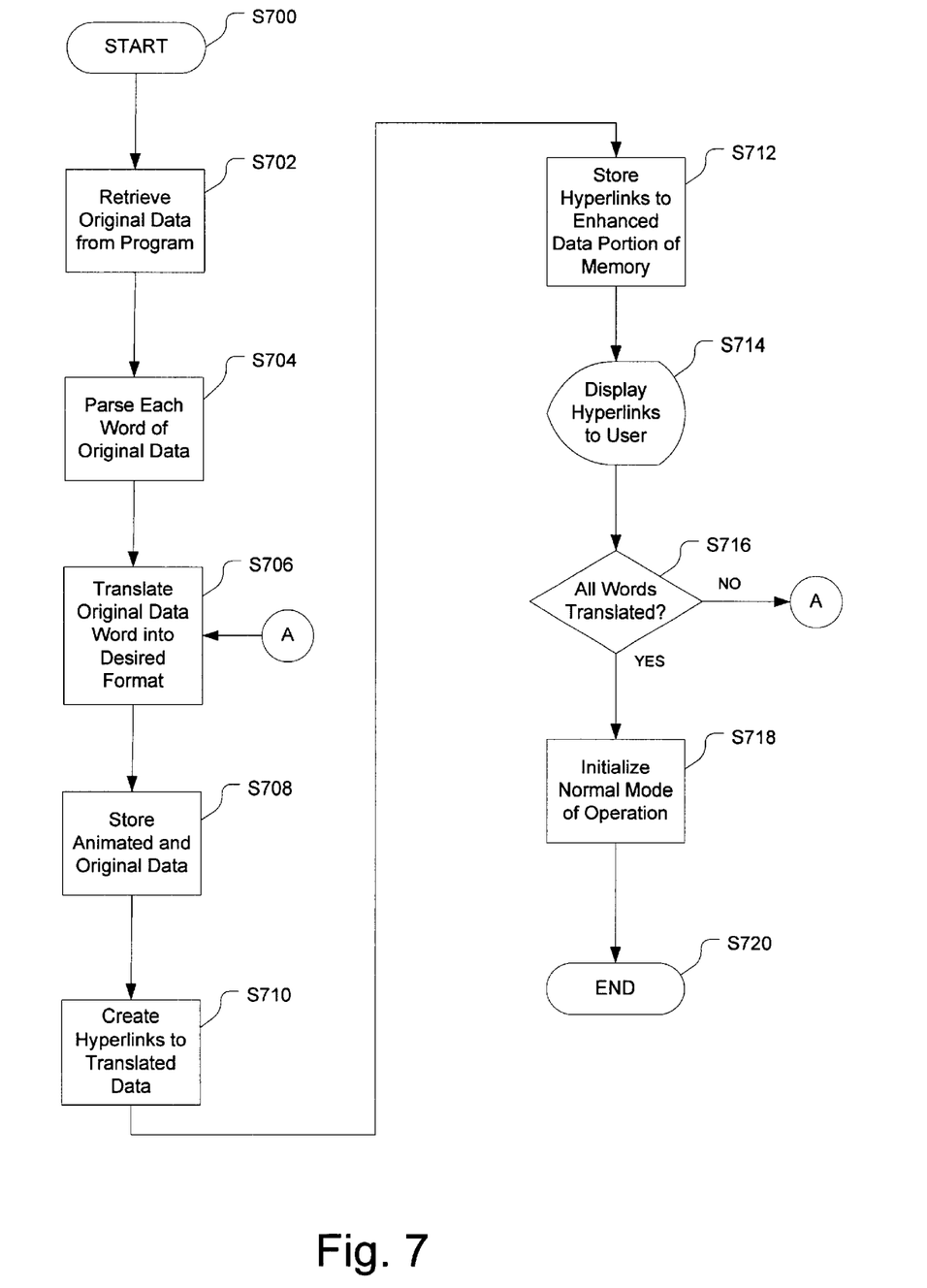
FIG. 7 is a flowchart outlining a first exemplary embodiment of a method for initializing the program enhancer system of FIG. 2.

An exemplary embodiment of the method and the system used to initialize the program enhancer system is outlined in a flow chart shown in FIG. 7. The control routine begins at step S700 and continues to step S702. In step S702 the control routine retrieves original data from an existing computer program on a CPU and continues to step S704. In step S704, the control routine parses each word or phrase of the original data to place it in a format that is translatable at step S706. In step S706, the control routine translates each word or phrase of the original data in to a pre-selected format. The translated format can be any of text-to-image, text-to-digital movies or text-to-animation. The process then continues to step S708 where the translated data and the original data is stored. The original data is stored in a designated original data portion of the system's memory. The translated data is stored in a media database section that places the data in a format and structure that is easily accessible and usable by the system. Once step S708 is complete, the process continues to step S710. In step S710, hyperlinks, pointers, etc. are created for each entry of stored data in the media database. The hyperlinks, etc. provide information on the location of each of the translated portions for use by the system. The control then continues to steps S712 and S714. At step S712, each of the hyperlinks are stored in an enhanced data section of the memory. The process at step S714 displays each of the newly created and stored hyperlinks to the user on a display apparatus. The process then continues to step S716 where the control process ensures that all desired original data words have been translated. If all desired words have not been translated, then control jumps back to step S706 where the process of translating and storing original data repeats until all desired original data is properly translated. Once all words have been properly translated, control continues to step S718. At step S718, the process initializes a normal mode of operation. In the normal mode, an input/output interface monitors incoming links and an internal control bus for incoming input. In this mode of operation, the input/output interface is capable of deciphering between the types of input. The process then continues to step S720 where the initialization process ends and the normal mode of operation continues.

Figure 8A:
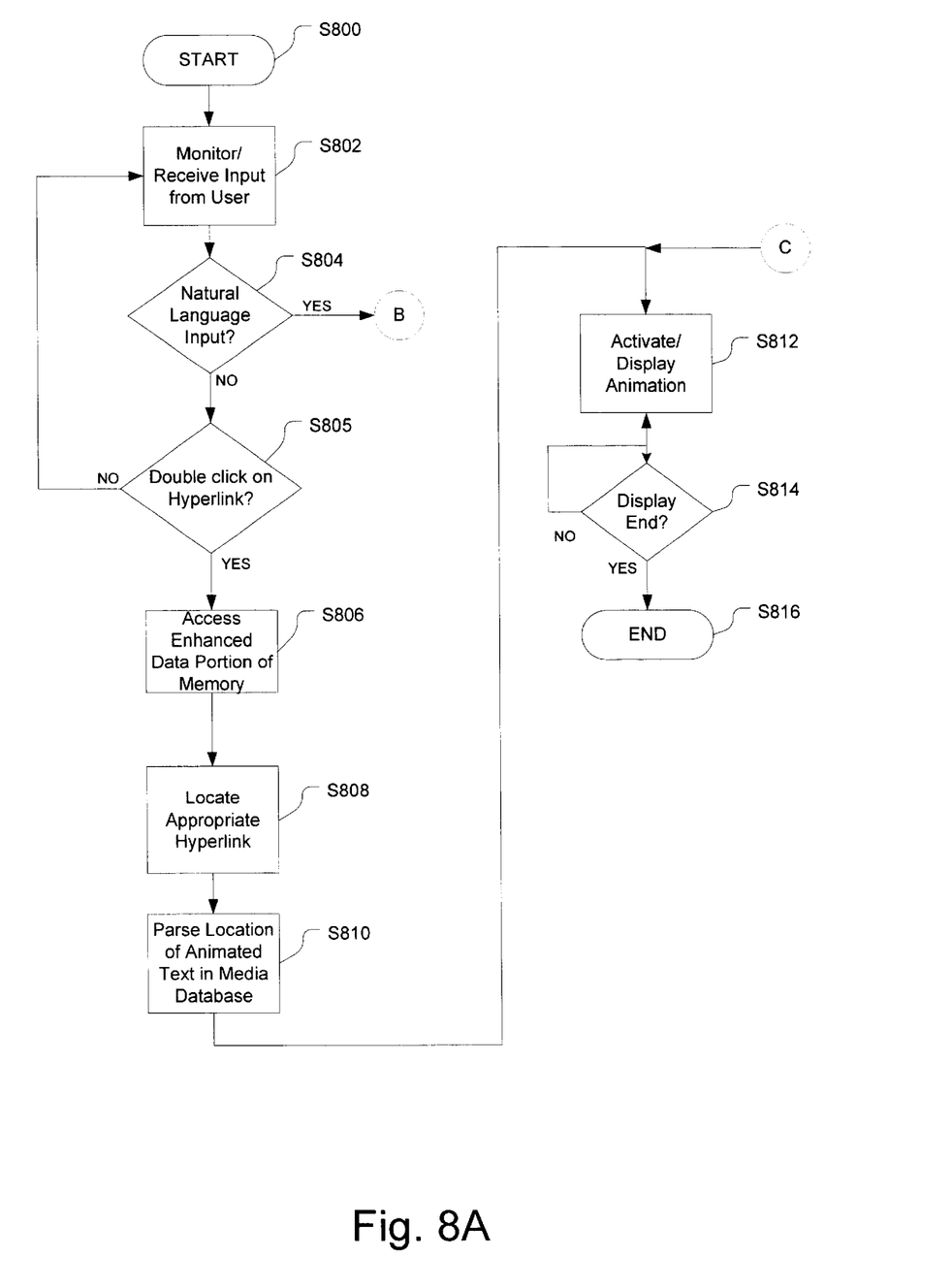
FIG. 8 is a flowchart outlining a first exemplary normal mode of operation of the program enhancer system of FIG. 2.
Figure 8B:
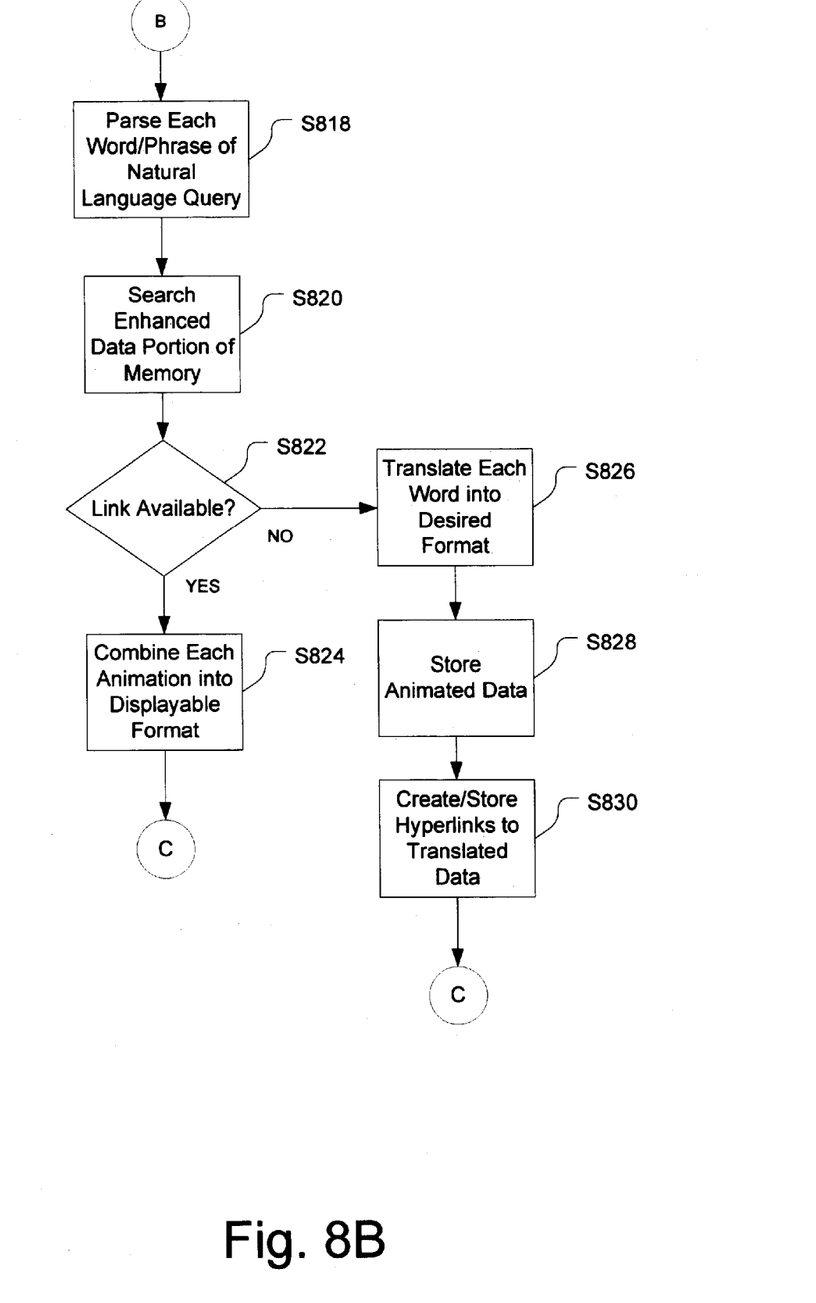

Upon completion of the initialization process, the program enhancer system enters a normal mode of operation. FIG. 8 is an exemplary flowchart of the normal mode of operation for the program enhancer system. The control routine starts at step S800 and continues to step S802 where the control routine places the input/output interface in a monitoring mode for data incoming to the interface. In this monitoring mode, the input/output interface is able to discriminate between the types of incoming data. Upon receipt of a data type, the control moves to step S804. In step S804, the system determines if the incoming data is a natural language input. If the input is in a natural language format, control moves to step S818. Otherwise, the process continues to step S805. In step S805, the process determines if the input was the result of an initialization of a hyperlink. If the input was the result of the initialization of a hyperlink, the process continues to step S806. Otherwise, the process returns to step S802. In step S806, the process accesses the enhanced data portion of the system and then continues to step S808. In step S808, the process locates the corresponding hyperlink and continues to step S810. In step S810, the process locates the appropriate animated text in the media database and continues to step S812. In step S812, the process activates the selected animation, displays the animation to a user, and continues to step S814 where the system monitors to determine if the animation display has completed. Once it has been determined that the display of the animation has been completed the process ends at step S816.

In step S818, the process parses each word of the natural language query into individual words or phrases and then continues to steps S820 and S822. In steps S820 and S822, the process searches each parsed word against the media database to determine if a hyperlink already exists. If a hyperlink already exists for the searched word, the process continues to step S824. Otherwise, the process continues to step S826. In step S824, the words having an existing hyperlink are concatenated so that the words are displayable to the user in a smooth manner. Upon completing step S824, control returns to step S812 and continues to steps S814 and S816, as discussed above.

In step S826, each word not having an existing hyperlink is translated to the desired format. The process then continues to step S828. In step S828, each newly created animation is stored in a media database. The process then continues to step S830 where hyperlinks are created for each newly created and stored animated data. Upon completing step S830, control returns to step S812 and continues to steps S814 and S816, as discussed above.

While this invention has been described in conjunction with the exemplary embodiments outlined above, it is evident that many alternatives, modifications and variations will be apparent to those skilled in the art. Accordingly, the exemplary embodiments of the invention, as set forth above are intended to be illustrative, not limiting. Various changes may be made without departing from the spirit and the scope of the invention.

What is claimed is:

1. A system for embedding existing computer program with hearing-impaired friendly information comprising:
   a general-purpose computer containing an existing computer program, wherein the existing computer program contains original data; and
   a program enhancer system connected to the general purpose computer for embedding the existing computer program with hearing-impaired friendly information, wherein the program enhancer system comprises:
   a controller coupled to a memory device;
   an input/output interface;
   a media database;
   a query parser device; and
   a program embedder device for creating the hearing-impaired friendly information based on the original data, wherein each of the aforementioned items are interconnected to each other using a data bus.

2. The system of claim 1, wherein the memory contains at least an original data portion and an enhanced data portion.

3. The system of claim 1, wherein the program embedder device contains:
   a translation device;
   a media retriever device; and a link creator device, wherein each of the aforementioned items are interconnected to each other using a second data bus.

4. The system of claim 3, wherein the program embedder device produces the hearing-impaired friendly information by translating the original data into animated data based on a desired format using the translation device.

5. The system of claim 4, wherein the desired format comprises one of:

an animation format;

a still image format; and a digital movie format.

6. The system of claim 5, wherein the desired format is pre-selected by the user prior to translating the original data.

7. The system of claim 4, wherein the program embedder system creates a hyperlink to the location of the animated data stored on the media database using the link creator device.

8. The system of claim 7, wherein the hyperlink is displayed to a user using a graphical user interface (GUI) on the display device.

9. The system of claim 8, wherein the animated text is displayed to the user in a display window in response to a user input from the user input device.

10. The system of claim 9, wherein the query parser device determines a format of the user input based on data received from the user input device.

11. The system of claim 10, wherein the format of the user input can include:

a natural language format; and a hyperlink-based format.

12. The system of claim 1, wherein the media database stores the animated data for access by the program embedder system.

13. The system of claim 12, wherein the hyperlink is stored in the enhanced data portion of the memory.

14. The system of claim 1, wherein the original data portion stores the original data for access by the program embedder system.

* * * * *